United States Patent
Simpson

(10) Patent No.: US 7,421,390 B2
(45) Date of Patent: Sep. 2, 2008

(54) METHOD AND SYSTEM FOR VOICE CONTROL OF SOFTWARE APPLICATIONS

(75) Inventor: Nigel D. Simpson, Bainbridge Island, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1085 days.

(21) Appl. No.: 10/244,131

(22) Filed: Sep. 13, 2002

(65) Prior Publication Data

US 2004/0054539 A1    Mar. 18, 2004

(51) Int. Cl.
*G10L 11/00*    (2006.01)
*G10L 21/00*    (2006.01)

(52) U.S. Cl. .................................. 704/270; 704/275

(58) Field of Classification Search .................. 704/275, 704/270
See application file for complete search history.

(56) References Cited

U.S. PATENT DOCUMENTS

| | | | |
|---|---|---|---|
| 5,664,061 A * | 9/1997 | Andreshak et al. | 704/275 |
| 5,897,618 A * | 4/1999 | Loats et al. | 704/275 |
| 5,941,947 A * | 8/1999 | Brown et al. | 709/225 |
| 6,101,472 A * | 8/2000 | Giangarra et al. | 704/275 |
| 6,185,535 B1 | 2/2001 | Hedin et al. | 704/270 |
| 6,233,559 B1 * | 5/2001 | Balakrishnan | 704/275 |
| 6,308,157 B1 * | 10/2001 | Vanbuskirk et al. | 704/275 |
| 6,473,781 B1 * | 10/2002 | Skagerwall et al. | 709/201 |
| 6,493,671 B1 * | 12/2002 | Ladd et al. | 704/270 |
| 6,587,836 B1 * | 7/2003 | Ahlberg et al. | 705/26 |
| 6,772,123 B2 * | 8/2004 | Cooklev et al. | 704/270.1 |
| 6,801,528 B2 * | 10/2004 | Nassar | 370/389 |
| 6,823,225 B1 * | 11/2004 | Sass | 700/94 |
| 7,100,166 B2 * | 8/2006 | Takatama et al. | 719/318 |
| 7,110,750 B2 * | 9/2006 | Oishi et al. | 455/414.1 |
| 2001/0056346 A1 | 12/2001 | Ueyama et al. | 704/246 |

FOREIGN PATENT DOCUMENTS

| | | |
|---|---|---|
| EP | 1 104 155 A2 | 5/2001 |
| GB | 2 364 480 A | 1/2002 |
| WO | WO 93/01664 | 1/1993 |
| WO | WO 00/58942 A3 | 3/2000 |
| WO | WO 03/055688 A1 | 7/2003 |

OTHER PUBLICATIONS

UK Search Report dated Apr. 26, 2004 (5 pgs.).
UK Search Report dated Feb. 6, 2004 (3 pgs.).

* cited by examiner

*Primary Examiner*—Patrick N. Edouard
*Assistant Examiner*—Eric Yen
(74) *Attorney, Agent, or Firm*—Osha·Liang LLP

(57) ABSTRACT

In one embodiment of the present invention, a voice control application transmits data to a voice server about a first execution state of an application program resident in the memory of an electronic device having a first graphical display. The voice control application also transmits an audio waveform encoding of a voice command defining a second execution state of the application program. The voice server performs a speech recognition process upon the audio waveform encoding and transmits a reply to the electronic device for causing the second execution state of the application program. The voice control program, in response to the response, automatically causes the second execution state of the application program having a second graphical display.

14 Claims, 6 Drawing Sheets

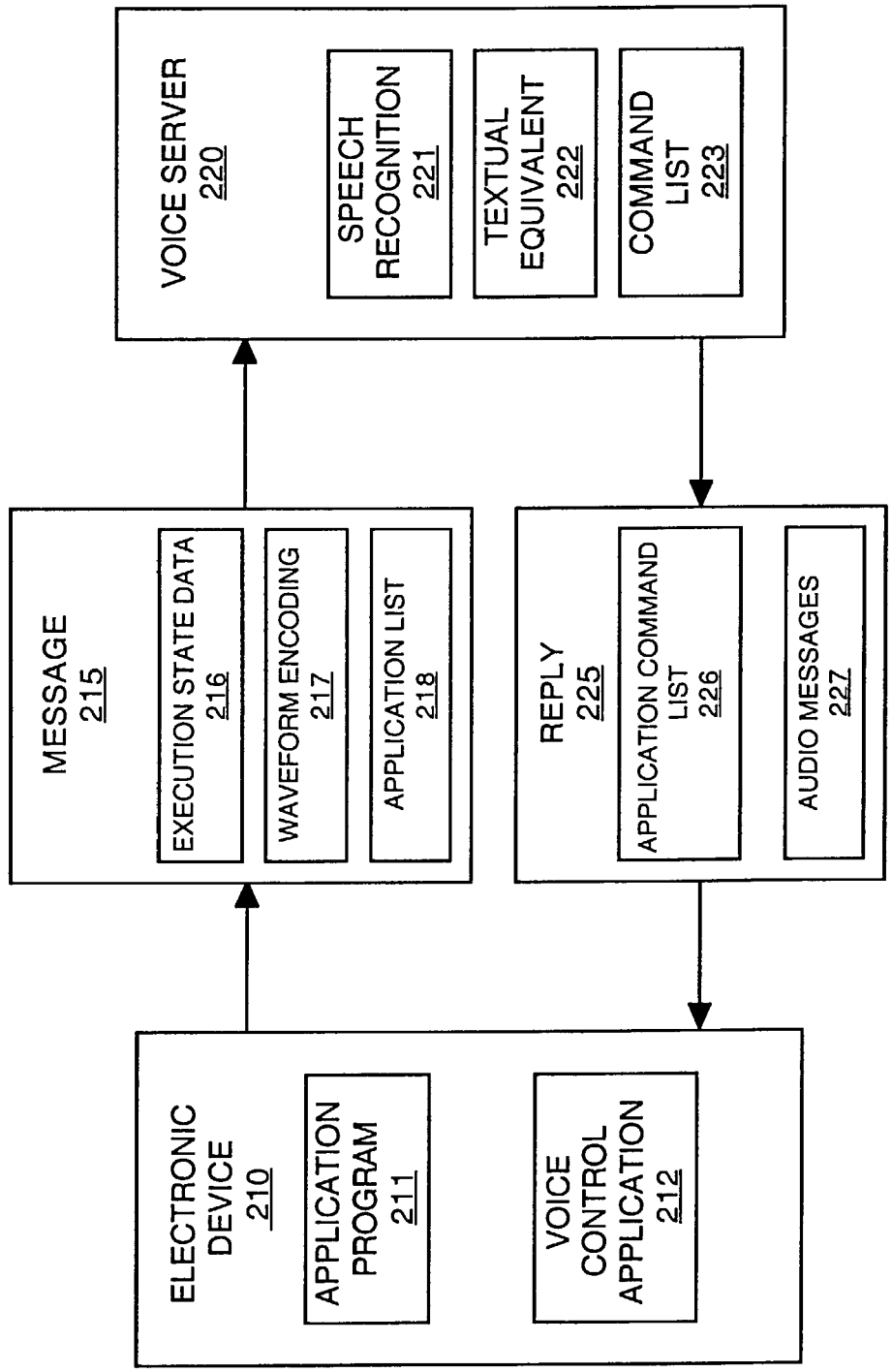

| TEXTUAL EQUIVALENT 222 |
|---|
| "WHAT ARE MY APPOINTMENTS FOR JULY FIRST?" |

| COMMAND LIST 223 |||
|---|---|---|
| COMMAND KEYWORDS 223a | EXECUTION STATE 223b | CONTROLLER COMMANDS 223c |
| "WHAT ARE MY APPOINTMENTS FOR" | MAIN MENU | \<down arrow\> |
| | PHONE BOOK | \<down arrow\> |
| | MESSAGES | \<down arrow\> |
| | CALENDAR | \<*\> |
| | APPOINTMENTS | \<*\> |
| "JULY" | APPOINTMENT MONTH VIEW | \<*\> |
| | JAN | \<down arrow\> |
| | FEB | \<down arrow\> |
| | MAR | \<down arrow\> |
| | APR | \<down arrow\> |
| | MAY | \<down arrow\> |
| | JUN | \<down arrow\> |
| | JUL | \<*\> |
| "FIRST" | 1st DAY VIEW | \<*\> |
| | | \<*\> |

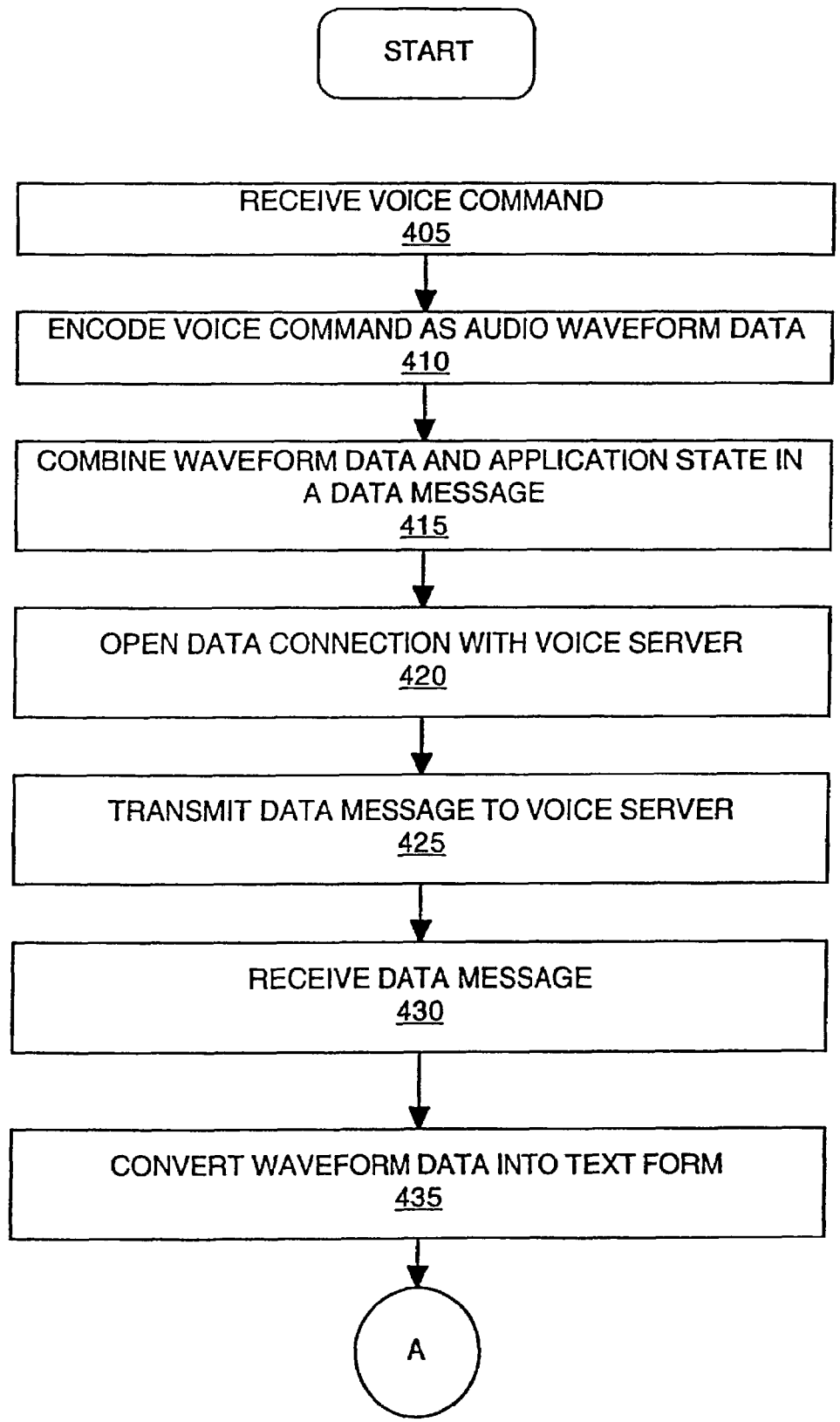

METHOD AND SYSTEM FOR VOICE CONTROL OF SOFTWARE APPLICATIONS

FIELD OF THE INVENTION

The present invention relates to the field of electronic devices. More specifically, embodiments of the present invention are directed to controlling software applications using voice commands.

BACKGROUND OF THE INVENTION

Speech recognition has become an important growth sector in the computer industry. The goal of speech recognition is to allow users to interact with computers using natural speech. A variety of disciplines are involved in designing a speech recognition application including: acoustics, signal processing, pattern recognition, phonetics, linguistics, and computer science. Therefore, in order to provide an acceptable level of performance, speech recognition applications are complex programs that typically are computationally intensive. Due to the complexity of speech recognition applications, early implementations of speech recognition software were usually implemented on dedicated speech recognition servers. A typical speech recognition server is a high-performance rack mounted computer system that shares the processing load among multiple processors. Thus, initial speech recognition applications were limited to expensive, high performance computer systems.

More recently, advances in desktop computer performance have facilitated more widespread use of speech recognition technology. Specifically, advances in desktop CPU performance, memory size, and storage capacity enable real-time speech recognition capabilities on desktop scale devices. Thus, users can dictate documents and navigate the computer desktop using their voice. However, handheld devices, such as cellular telephones and personal digital assistants, do not yet provide the comparable levels of performance required by these types of applications.

Additionally, many users find the process of installing and adjusting speech recognition software burdensome. For example, in order to provide optimal performance, the speech recognition application typically needs to be "trained" to recognize the unique nuances of a particular user's voice. This can involve hours of training and correcting the system in order to attain acceptable speech recognition quality. Thus, many computer users regard speech recognition applications as being impractical either due to their hardware requirements or due to the effort associated with installing and training the software. Typically, a special software interface is required in order to control existing software applications using speech recognition. Therefore, until a software interface is created, users cannot use spoken commands to control their software.

Waveform analysis is a simplified implementation of speech recognition technology. Waveform analysis software is typically used on devices having limited hardware capabilities such as cellular phones and Personal Digital Assistants (PDAs) and is programmed by the user to recognize commands spoken by the user. Waveform analysis software attempts to match a user's spoken command with a previously recorded waveform of the command. If the waveform of the spoken command matches the recorded waveform, the software recognizes the waveform and may perform an action associated with the spoken command. Thus, waveform analysis compares waveforms as a whole rather than analyzing the sound components, known as phonemes, of the spoken command. Furthermore, waveform analysis is typically applied to a set of narrowly focused, simple actions such as voice dialing rather than the more general purpose speech recognition software described above.

Another application of speech recognition technology involves voice portal services. Voice portals provide users with automated services and information using a voice interface. Typically, a user calls a voice portal and hears a list of options that they can choose from using voice commands. Users calling a voice portal can choose from a variety of information options including stock quotes, weather and traffic reports, horoscopes, movie and television schedules, and airline arrival and departure information. Services provided by voice portals include restaurant reservations, airline ticket purchases, and Internet navigation.

A typical voice portal system utilizes vast arrays of hardware for receiving telephone calls and processing the voice stream in order to perform some action based upon the user's commands. FIG. 1 shows a typical prior art voice portal system. In FIG. 1, a user 110 calls a voice portal server 130 using phone system 120. Phone system 120 can be either a wireless cellular phone system or a Public Switched Telephone Network (PSTN). Upon calling voice portal server 130, a user 110 typically hears a menu of options. User 110 chooses one of the menu options by speaking a command. Voice portal server 130 interprets the spoken command and performs an action in response. This is similar to a previous technology in which a user hears a menu of options and indicates a preference by pressing the touch tone keys on their telephone.

In one embodiment, voice portal server 130 utilizes a Voice Extensible Markup Language (VoiceXML) interpreter comprising an Automated Speech Recognition (ASR) component 131, a Text to Speech (TTS) component 132, an audio play component 133, a Dual-Tone Multi-Frequency (DTMF) component 134, and a telephone network interface 135. ASR component 131 can be speech recognition software as described above, TTS component 132 is used to convert text into audio to be output to user 110. Audio play component 133 controls the playback of pre-recorded audio outputs from server 130 such as audio menus of options available to user 110. DTMF component 134 allows a user to input commands using the touch tone buttons on a telephone to choose from a menu of options. Telephone component 135 is for controlling telephone connections between voice portal server 130 and both phone system 120. A Voice Over Internet Protocol (VoIP) 136 interface provides an interface to voice applications connecting to the voice portal 130 over an Internet Protocol network connection.

In an exemplary communications session, user 110 utilizes voice portal server 130 as an intermediary to access content or services provided by an Application Web server 150. For example, user 110 initiates communications with voice server 130 using phone system 120 and sends a vocal command to server 130 which is interpreted by ASR component 131. A textual version of the vocal command is created by ASR component 131 and a request is sent to Application Web server 150 via Internet 140. Application server 150 then sends a reply to voice portal server 130. An audio equivalent of the reply from application server 150 can then be generated by TTS component 132 and audio component 133 and sent to user 110. Usually, the reply to user 110 is a menu of options from which user 110 indicates a preference in order to continue the session with application server 150.

While voice portal systems provide speech recognition functionality to users, they are limited in the variety of services they can provide. Most voice portal services provide a fixed set of capabilities to their users that are defined by the available menu options. Thus, user options are defined by the service provider and are usually limited to general services and information, such as weather reports, stock quotes, etc. More importantly, the user cannot control or access application programs resident upon their own computers using voice portal services. Another limitation of system 100 is that the output data is only in the form of speech making it hard to present certain types of data, such as large lists, to the user.

Another emerging speech recognition technology utilizes special purpose speech recognition hardware processors that are typically installed within cellular phones and PDAs. These embedded chips allow a user to initiate actions upon their devices using voice commands. However, this necessitates installing the hardware chip in the user's device, which may not be an option for a device the user is already using due to, for example, a limitation of the device's hardware architecture. Additionally, the hardware chips typically provide a limited range of speech recognition capability and are thus limited to simple applications such as voice dialing.

In order for a user to control the visual interface of application running on small form factor handheld electronic devices (e.g., cellular telephones and PDAs), a user typically navigates the application using a keypad and/or special soft function keys. This can be tedious and time consuming for users due to the limited nature of the display and software control capabilities built into such devices. For example, a user may have to enter long sequences of key-presses to navigate from the main menu of a cellular telephone to the particular display desired by the user. Alternatively, or in conjunction with a keypad, PDAs can provide handwriting recognition pads to facilitate user input, however, with small form factor devices such as cellular telephones, there is not always enough space to include handwriting recognition pads.

SUMMARY OF THE INVENTION

Accordingly, a need exists for a method and system that facilitates voice control of software applications but does not require modifying or re-writing the software applications. An additional need exists for a system that meets the above need and facilitates voice control of software applications upon handheld wireless devices without necessitating the installation of speech recognition hardware upon the wireless devices. A need further exists for a system which meets the above stated needs and facilitates voice control of software applications without necessitating the installation of complex speech recognition and/or voice synthesis software upon the handheld wireless devices.

In one embodiment of the present invention, a voice control application transmits data to a voice server about a first execution state of an application program resident in the memory of an electronic device displaying a first graphical user interface. The voice control application also transmits an audio waveform encoding of a voice command requesting a second execution state of the application program. The voice server performs a speech recognition process upon the audio waveform encoding and the voice server transmits a reply to the electronic device containing information necessary for causing the second execution state of the application program. The voice control program interprets the response and causes the application program to enter the second execution state and display a second graphical user interface. It is appreciated that the second graphical user interface may contain one or more data items obtained and transferred from the voice server.

The following example shows how voice commands are used to control a visual calendar application running on an electronic device in accordance with one embodiment of the present invention. A user speaks a command "What's happening on July first". A voice control application on the electronic device records the speech and creates a waveform encoding of the voice command. The voice control application opens a data connection to a voice server and transmits information about the current execution state of the active application (e.g., the visual calendar application) and the encoded waveform data of the voice command.

The voice server receives the data and passes the encoded waveform through a voice recognition process that converts the waveform into the textual equivalent, "What's happening on July first". The voice server compares the textual equivalent of the spoken command with a list of keywords that can be used in the context of the calendar application (e.g., "what's happening," "July," and "first"). A set of keywords is associated with a particular execution state of the application with which the user is interacting. The voice server determines a second execution state of the calendar application that is associated with the command "What's happening on July first". The voice server then creates a list of operations to be performed upon the electronic device to cause the calendar application to transition from the current execution state to the second execution state and transmits the list of operations to the electronic device.

The voice control application receives the operation list and executes each operation in sequence. For example, if the calendar application does not provide an Application Programming Interface (API), the voice server sends a sequence of commands (e.g., key press commands) which the voice control application uses to cause the calendar application to transition from the current execution state to the second execution state (e.g., the list of appointments for July first). The voice control application interfaces with the keypad controller to simulate the keypad commands the user would execute to control the calendar application manually. If the calendar application has a programming interface, then the voice control application can use this interface to cause the calendar application to go directly to the list of appointments display for July first.

Some operations sent by the voice server may not require action in the calendar application. For example, the operation list might include voice annotations to give the user audio feedback such as playing the following messages: "Going to July first," and "Here are your appointments for July first" when the appointment list is finally displayed. This, for example, can give the user audio feedback that the voice server correctly interpreted the command.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 2 is a block diagram of a system for voice control of software applications in accordance with embodiments of the present invention.

FIG. 3 shows exemplary components that are utilized upon a voice server in accordance with embodiments of the present invention.

FIGS. 4A, 4B, and 4C are flow charts of a method for voice control of software applications in accordance with embodiments of the present invention.

DETAILED DESCRIPTION OF THE PREFERRED EMBODIMENT

Figure 1:
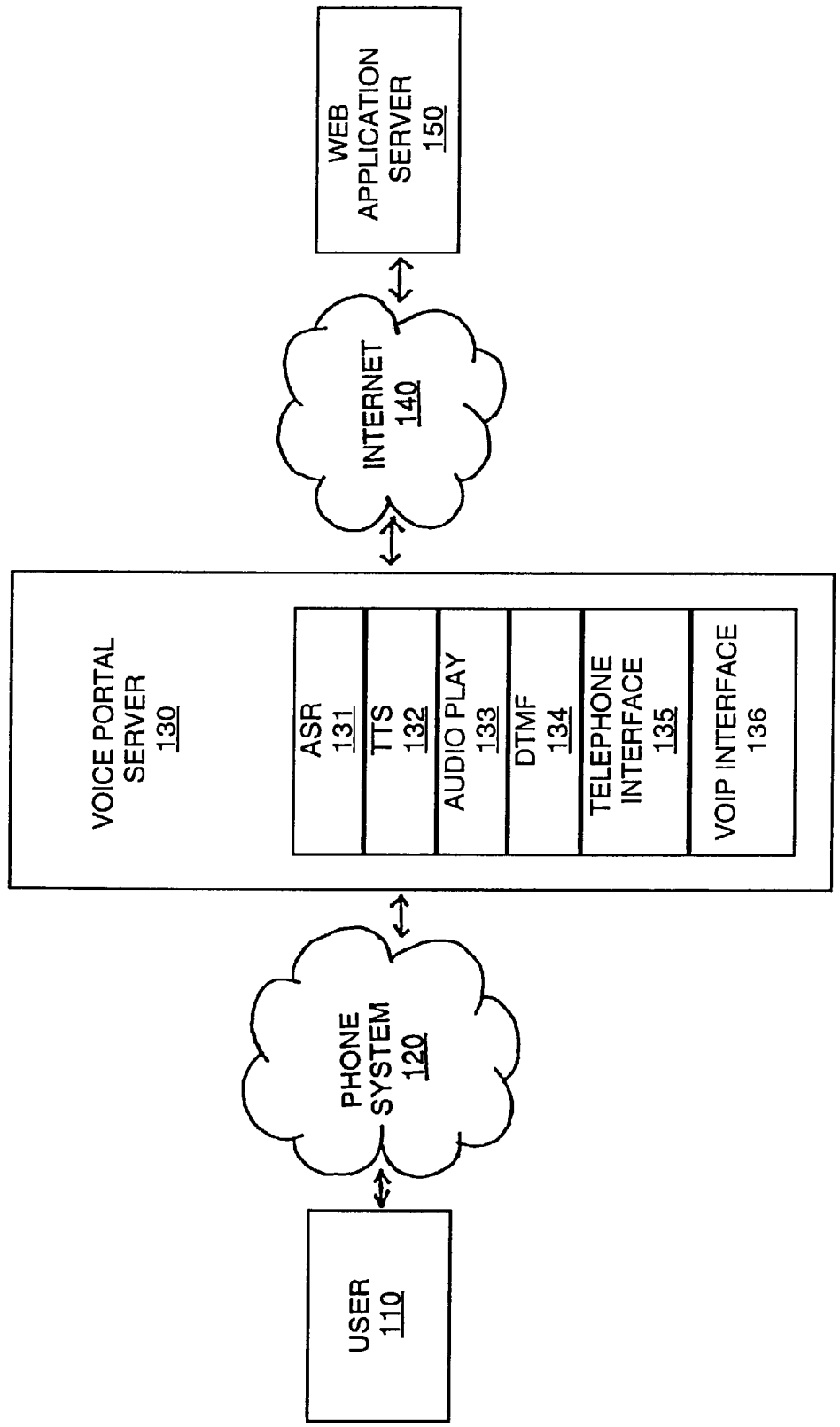
FIG. 1 shows an exemplary prior art voice portal system.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents that may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

The present invention is a method and system for voice control of software applications. Using embodiments of the present invention, a user can control software on electronic devices with voice commands without installing special speech recognition software or speech recognition hardware upon the electronic device. This is advantageous because many electronic devices, especially handheld electronic devices such as cellular telephones and PDAs, lack the memory, processing power, or storage capacity to utilize speech recognition software, or the physical capacity to install a speech recognition hardware device. Embodiments of the present invention utilize a voice server to receive the user's voice command and send commands back to the electronic device for controlling software applications stored upon the user's electronic device.

FIG. 2 is a block diagram of an exemplary system 200 for voice control of software applications in accordance with embodiments of the present invention. In FIG. 2, an electronic device 210 with audio input/output capabilities sends message 215 to a voice server 220. In one embodiment of the present invention, electronic device 210 is a handheld electronic device such as a cellular telephone or a Personal Digital Assistant (PDA) with built-in wireless communications capabilities. However, while the present embodiment recites handheld electronic devices, the present invention is well suited to be utilized upon other electronic devices such as desktop computers, mobile or laptop computer systems, embedded computer systems, etc. In accordance with embodiments of the present invention, a voice control application 212 resident upon electronic device 210 causes electronic device 210 to transmit data (e.g., message 215) upon receiving a voice command. In one embodiment, electronic device 210 transmits message 215 to voice server 220 wirelessly using, for example, radio frequency connections.

In one embodiment of the present invention, message 215 comprises execution state data 216 that describes a first execution state of an application program (e.g., application program 211) resident upon electronic device 210. For example, if a calendar application is operating on a handheld device (e.g., a cellular telephone) and is displaying the main menu of the application, voice control application 212 sends execution state data telling voice server 220 that the main menu of the calendar application is being displayed. Furthermore, message 215 comprises an audio waveform encoding 217 of a voice command describing a second execution state of application program 211. For example, a user inquiry of "What are my appointments for July first?" is a request for a second execution state of the calendar application in which the July first appointments are displayed. There are a variety of implementations for creating and recording audio waveform data that can be used with embodiments of the present invention. Sending a waveform facilitates sending the user's voice commands without the necessity of installing speech recognition software upon electronic device 210. Speech recognition software can require significant resources that may not be available on electronic device 210 such as storage, memory, and processing power.

Upon receiving message 215, voice server 220 determines the first execution state of application program 211 (e.g., the main menu of the calendar application) from execution state data 216. Voice server 220 also performs a speech recognition process upon waveform encoding 217 using speech recognition component 221. In one embodiment, speech recognition component 221 receives waveform encoding 217 and, using speech recognition software, performs an analysis of the user's voice command. Furthermore, in one embodiment, speech recognition component 221 creates a textual equivalent 222 of waveform encoding 217. For example, if a user gives a voice command, "What are my appointments for July first", voice server 220 converts the waveform encoding of the voice command into a textual equivalent 222 of the spoken command using speech recognition component 221.

In one embodiment, voice server 220 compares textual equivalent 222 to a command list 223. In one embodiment, command list 223 comprises lists of command keywords that are specifically associated with particular states of the application (e.g., application 211) with which the user is interacting. In other words, command list 223 is a list of commands that are unique to the possible execution states of application program 211. In one embodiment, each command or keyword on command list 223 is associated with a particular execution state of the current application program. FIG. 3 shows an exemplary textual equivalent of a spoken command (e.g., textual equivalent 222) and an exemplary command list (e.g., command list 223). In FIG. 3, command list 223 further comprises a list of command keywords (e.g., command keywords 223a of FIG. 3), a list of associated execution states (e.g., execution state list 223b of FIG. 3), and a list of commands (e.g., controller commands 223c of FIG. 3).

Voice server 220 compares the textual equivalent of the user's spoken command to the keywords in command keyword list 223a to identify the second execution state of application program 211 that is described in the user's spoken command. In one embodiment, voice server 220 attempts to match textual equivalent 222 to keywords in command list 223. Referring to FIG. 3, voice server 220 compares the spoken command of textual equivalent 222 (e.g., "What are my appointments for July first?") with the list 223a and matches the words "What are my appointments for," "July," and "first" from textual equivalent 222. Then, voice server 220 determines the second execution state of application program 211 by referencing execution state list 223b and finding the current execution state (e.g., "main menu") and the destination execution state corresponding to the command "what are my appointments for" and command parameters "July" and "first" from list 223a (e.g., execution state=calendar/appointments/appointment month view/July/1st/day view).

In one embodiment, voice server 220 then determines a list of operations to cause application program 211 to transition from the first execution state (e.g., the main menu), as described in execution state data 216, to the second application state (e.g., execution state=calendar/appointments/appointment month view/July/1st/day view), which is identified in command list 223b. The list of operations may comprise a single operation or a series of operations. In the embodiment of FIG. 3, the list of operations is determined by associating an execution state from list 223b with a series of control commands from list 223c. In the embodiment of FIG. 3, list 223c comprises a list of keypad operations a user might enter manually in order to navigate from the main menu display to the appointment display for July first. However, in other embodiments of the present invention, the controller commands of list 223c may comprise controller commands for other interfaces such as a touch screen, API interface commands, etc., depending on the type of interface used on electronic device 210.

Referring again to FIG. 3, a user manually navigating to the appointments display from the main menu might press the down arrow key once to select the phone book option. Pressing the down arrow key again results in the messages option being selected. Pressing the down arrow key again results in the calendar option being selected. The user then presses the * key to open the calendar interface. Pressing the * key again opens the appointments interface, and the appointment month view interface is then displayed. The user presses the * key again to open the appointment month view interface and then presses the down arrow key six times until the interface for the month of July is displayed. The user presses the * key to select the July interface, and presses the * key again to select the interface for the first day of July. Finally, the user presses the * to open the July first interface. At this time, the user can view the appointments for July first on electronic device 210.

However, many users find the plurality of key presses necessary to manually navigate the interface bothersome and inconvenient. The present invention uses list 223c to determine a list of operations for causing the second execution state of application program 211 to be entered. Thus, in the example of FIG. 3, this list of operations comprises the plurality of <down arrow>and <*>commands the user would manually enter on electronic device 210 in order to navigate to the July first appointments display.

In accordance with embodiments of the present invention, voice server 220 then sends reply 225 to electronic device. In embodiments of the present invention, reply 225 comprises an application command list 226 and audio message 227. In accordance with embodiments of the present invention, reply 225 may be a single message, or a series of discreet messages to electronic device 210. Application command list 226 is a list of operations for causing application program 211 to transition from its first execution state (e.g., main menu of the calendar application) to a second execution state (e.g., calendar/appointments/appointment month view/July/1st/day view).

In one embodiment, application command list 226 comprises a list of controller commands (e.g., keypad controller commands or touch screen controller commands) which are used by voice control application 212 for causing application program 211 to transition from its first execution state to the second execution state. For example, the keypad controller commands from controller command list 223c are transmitted in application command list 226 and are executed by voice control application 212 to simulate the keypad commands the user would manually enter on electronic device 210 in order to control application program 211 (e.g., to navigate from the first execution state of application program 211 to the second execution state). Voice control application 212 then implements the keypad controller commands from application command list 226 to cause application program to transition from the first execution state to the second execution state. For example, for a user to manually navigate from the main menu of the calendar application to the July first display, the user might have to manually enter a lengthy series of keypad entries. This can be time consuming and bothersome to some users. The present invention allows the user to navigate to the July first display directly using voice commands that replicate the keypad entries for the user.

In one embodiment, the display screen of electronic device 210 sequences through the displays a user would see if manually navigating from the first execution state of application program 211 to the second execution state. In another embodiment, voice control application 212 implements the sequence of keypad commands and causes application program 211 to navigate to the second execution state in a manner that is transparent to the user. Referring to the previous example, upon receiving reply 225 from voice server 220, voice control application 212 causes application program 211 (e.g., the calendar application) to transition from the first execution state (e.g., the main menu display) to the second execution state (e.g., the appointment list view for July first) using the keypad commands from application command list 226 without flashing through the sequence of displays.

In another embodiment of the present invention, application command list 226 comprises an application programming interface (API) command. Voice control application 212 uses the API command to cause application program 211 to transition to the second execution state. For example, the API command of application command list 226 may enable voice control application 212 to cause application program 211 to transition directly from the first execution state to the second execution state. Referring to the previous example, upon receiving reply 225 from voice server 220, voice control application 212 causes application program 211 (e.g., the calendar application) to transition directly from the first execution state (e.g., the main menu display) to the second execution state (e.g., the appointment list view for July first).

In accordance with embodiments of the present invention, reply 225 may further comprise audio message 227. Audio message 227 is an annotated message for giving the user audio feedback of what is happening. For example, if voice server 220 is performing a lengthy process, audio message 227 can let the user know that the desired process is being performed.

Additionally, audio message 227 can provide confirmation to the user that their voice command was properly understood by voice server 220 and is being executed. For example, if the user asks "What are my appointments for July first?" audio message 227 may be, "Retrieving appointments for July first." In one embodiment, audio message 227 may actually read the users appointments to the user. For example, audio message 227 may play the following audio prompts: "Going to July first", "You have two appointments for July first", "You have a 10:00 AM weekly staff meeting", and "You have a 2:00 PM conference call with Steve."

In one embodiment, audio message 227 is an audio waveform encoding. This allows electronic device 210 to play back audio message 227 without the necessity of installing text-to-speech software upon electronic device 210. Text-to-speech software can require significant resources that may not be available on electronic device 210 such as storage, memory, and processing power.

In so doing, embodiments of the present invention provide a system which facilitates voice control of software applications and which does not require modifying the software application being controlled. In particular, the present invention facilitates voice control of software application visual interfaces. Furthermore, embodiments of the present invention facilitate voice control of software applications on handheld wireless devices and do not require installation of speech recognition and/or speech synthesis software upon those devices. This is advantageous because many handheld wireless devices lack the storage, memory, and processing power to run speech recognition or speech synthesis software with an acceptable level of performance. Additionally, the present invention allows a user to control software applications on handheld devices using both speech and visual interfaces.

In one embodiment of the present invention, such as when a user has not initiated an application program upon electronic device 210, the present invention can be used to select and initiate a software application using voice commands. Thus, in one embodiment of the present invention, message 215 comprises waveform encoding 217 and application list 218. Waveform encoding 217 comprises an audio waveform encoding 217 of a voice command describing an execution state of application program 211.

Application list 218 is a list of software applications stored upon electronic device 210. A user speaks a command into electronic device 210 for initiating one of the application programs stored upon electronic device 210. For example, a user is at the main menu of the operating system of electronic device 210 and speaks a voice command (e.g., "calendar," or "What are my appointment for July first?"). Voice control application 212 sends a waveform encoding of the user's voice command (e.g., waveform encoding 217) and a list of software applications stored upon electronic device 210 (e.g., application list 218).

Voice server 220 performs a speech recognition process upon waveform encoding 217 using speech recognition component 221. In one embodiment, speech recognition component 221 receives waveform encoding 217 and, using speech recognition software, performs an analysis of the user's voice command. In one embodiment, speech recognition component 221 creates a textual equivalent 222 of waveform encoding 217.

In embodiments of the present invention, voice server 220 then compares textual equivalent 222 with a plurality of command lists (e.g., command lists 223). For example, textual equivalent 222 is compared with each command list that corresponds to a software application listed in application list 218 to determine which software application the user wants to initiate. In one embodiment, voice server 220 attempts to match textual equivalent 222 to keywords in command list 223a.

In one embodiment, upon matching textual equivalent with a keyword from command list 223a, voice server 220 then determines a sequence of steps to initiate application program 211 upon electronic device 210. In one embodiment, voice server 220 sends an audio message to electronic device allowing the user to determine whether the voice server 220 has identified the correct application program. This allows the user to terminate the current operation if, for example, voice server 220 attempts to initiate a calendar application when the user actually wants to initiate an address book application.

In one embodiment of the present invention, voice server 220 then sends reply 225 to electronic device 210. Reply 225 comprises application command list 226, and audio message 227. Application command list 226 is a series of commands that allow voice control application 212 to initiate application program 211 upon electronic device 210.

Thus, embodiments of the present invention facilitate controlling software applications using voice commands. More specifically, the present invention allows a user to initiate software applications using voice commands. Embodiments of the present invention allow controlling software using voice commands without the necessity of installing special speech recognition hardware or software on the user's electronic device. This is advantageous for users of small form factor electronic devices such as cellular telephones and Personal Digital Assistants that may lack the memory, storage capacity, or processing power to obtain a suitable level of performance from locally installed speech recognition software.

Figure 4B:
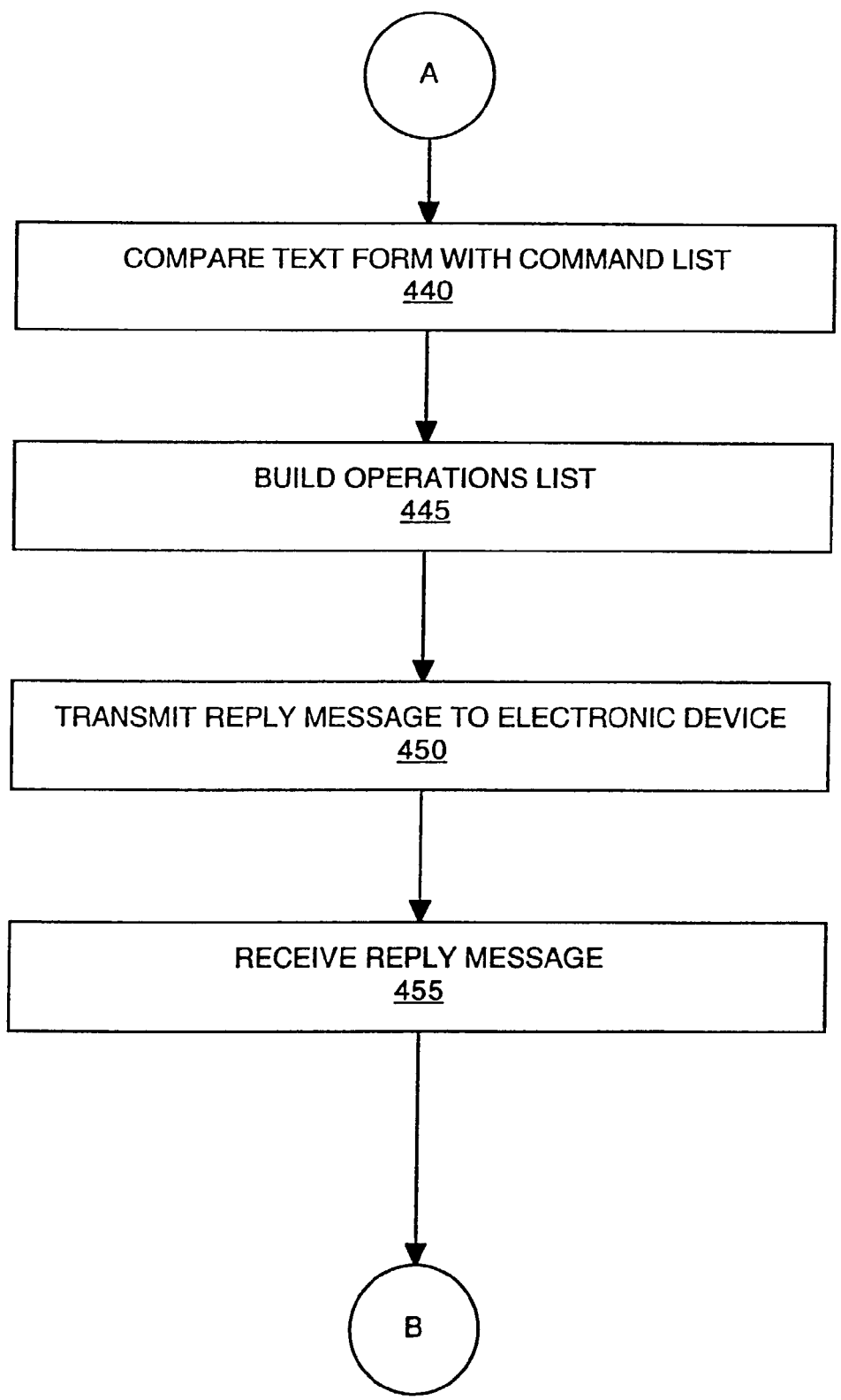
Figure 4C:
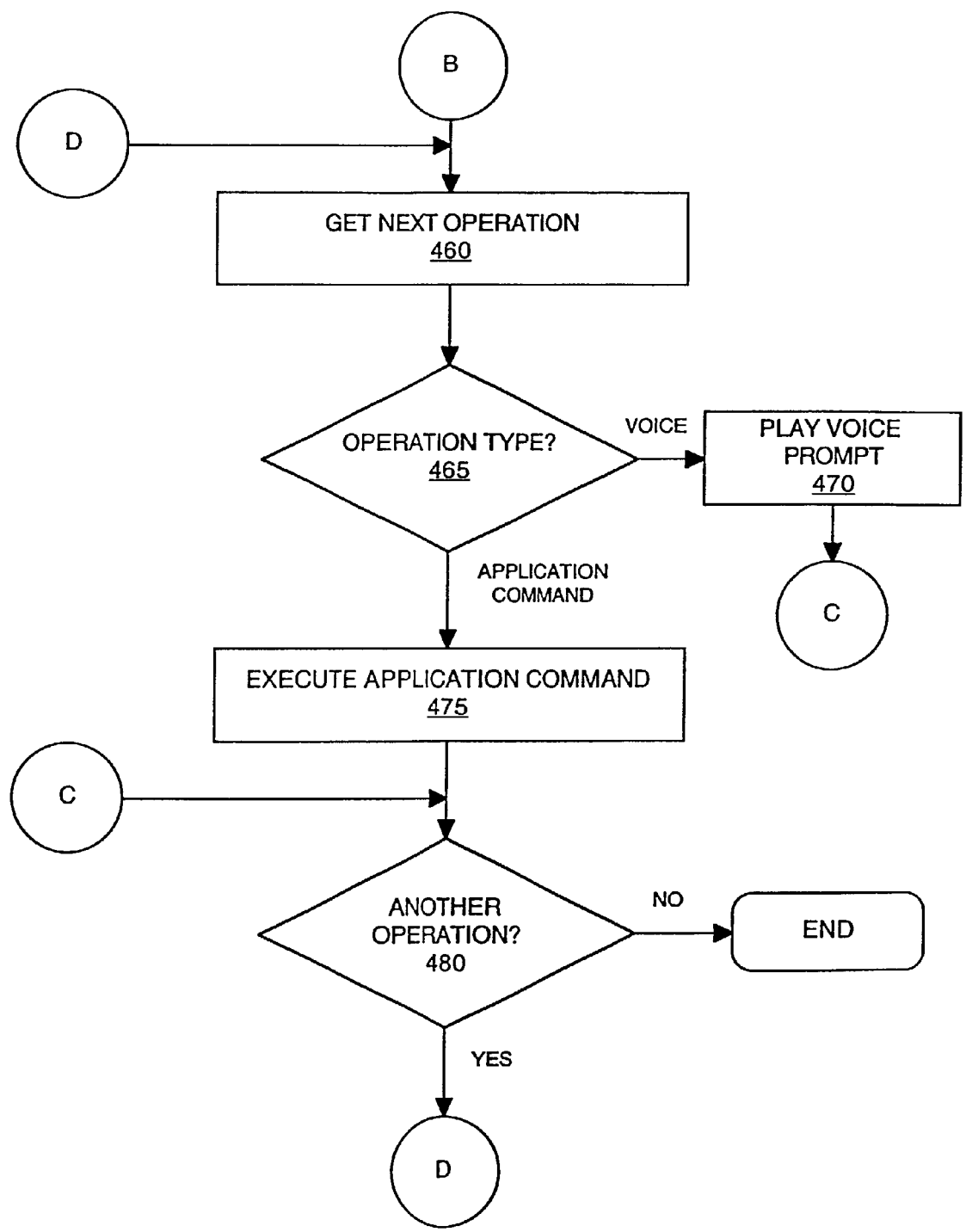

FIGS. 4A, 4B, and 4C are flow charts of a computer implemented method 400 for voice control of software applications in accordance with embodiments of the present invention. In step 405 of FIG. 4A, a voice command is received by an electronic device. In one embodiment, the electronic device is displaying the main menu of its operating system. A voice command is used to initiate one of the application programs stored upon the electronic device. Referring to FIG. 2, a voice command is received by electronic device 210. In accordance with embodiments of the present invention, electronic device 210 can be a handheld electronic device such as a cellular telephone or Personal Digital Assistant. However, the present invention is well suited to be utilized upon a variety of electronic devices such as desktop computer systems, laptop computer systems, embedded computer systems, etc.

In step 410 of FIG. 4A, the voice command is encoded as audio waveform data (e.g., waveform encoding 217 of FIG. 2). There are a variety of formats for capturing waveform data that can be utilized with embodiments of the present invention.

In step 415 of FIG. 4A, the audio waveform data and application state information are combined in a data message. In one embodiment, a data file of the waveform encoding of the user's voice command is combined with application state data in a data message (e.g., message 215 of FIG. 2). While the present embodiment recites encoding the voice command as audio waveform data, the present invention is well suited for utilizing other methods for sending the voice command. In one embodiment, application state data comprises execution state data (e.g., execution state data 216 of FIG. 2) about an application running on the electronic device. In another embodiment, application state data comprises execution state data about a software operating system operating on electronic device 210 as well as a list of applications (e.g., application list 218 of FIG. 2) stored upon electronic device 210.

In step 420 of FIG. 4A, a data connection is opened with a voice server. In one embodiment, the electronic device opens a wireless data connection with a voice server. In one embodiment, a user calls a voice server (e.g., voice server 220 of FIG. 2) and provides a username and password. However, embodiments of the present invention are well suited for other methods for opening a data connection with the voice server.

In step 425 of FIG. 4A, the data message is transmitted to the voice server. The electronic device transmits the data message containing the waveform encoding of the user's voice command as well as application state data. Again, in one embodiment, the data message is transmitted wirelessly by electronic device 210.

In step 430 of FIG. 4A, the voice server receives the data message.

In step 435 of FIG. 4A, the waveform data is converted into text form. Embodiments of the present invention utilize speech recognition software (e.g., speech recognition component 221 of FIG. 2) to convert the waveform data into a text form (e.g., textual equivalent 222 of FIG. 2).

In step 440 of FIG. 4B, the text form is compared with a command list. In one embodiment of the present invention, the text form of the user's voice command is compared to a list of command keywords (e.g., command list 223 of FIG. 2). In one embodiment, a unique list of command keywords exists for each application stored upon electronic device 210. Voice server attempts to match words in textual equivalent 222 with command keywords in command list 223 to determine the meaning of the user's voice command. In one embodiment, each command keyword in command list 223 is associated with a particular execution state of the application program associated with command list 223. When voice server 220 matches a word from textual equivalent 222 with a command keyword from command list 223, the execution state associated with the command keyword is interpreted to be the intended meaning of the user's voice command.

In step 445 of FIG. 4B, an operations list (e.g., application command list 226 of FIG. 2) is built. In embodiments of the present invention, upon determining the execution state of the application programs in step 440, voice server 220 creates a list of operations which will cause application program 211 to transition from its current execution state (as defined by the application state data it received from electronic device 210) to a second execution state (as defined by command list 223). In one embodiment, electronic device 210 is not currently running an application program and may be displaying the main menu of its operating system. Application command list 226 then comprises a list of operations for initiating application program 211 from the current application state of the software operating system of electronic device 210. This list of operations causes application program 211 to enter a first execution state. In another embodiment, application command list 226 comprises a list of operations for causing a currently running application program to transition from its current execution state to a second execution state In step 450 of FIG. 4B, a reply message is transmitted to the electronic device. In embodiments of the present invention, voice server 220 transmits data (e.g., reply 225 of FIG. 2) to electronic device 210. In one embodiment, reply 225 comprises application command list 226 and an appended audio message 227. In another embodiment, reply 225 comprises a sequence of commands and audio messages (e.g., command 1, audio message 1, command 2, audio message 2). Audio message 227 is for providing audio feedback to the user. For example, audio message 227 can repeat textual equivalent 222 of the user's spoken command in order to ensure that voice recognition component 221 correctly converted the spoken command into text. In another embodiment, audio message can be an audio reply to the user's voice command. For example, if the user's command is "What are my appointments for July first", audio message 227 may comprise a reply of "You have no appointments for July first". In one embodiment, reply 225 is a single data message from voice server 220 to electronic device 210 that has multiple parts. However, in other embodiments of the present invention, reply 225 can comprise a plurality of discreet communications from voice server 220 to electronic device 210.

In step 455 of FIG. 4B, the electronic device receives the reply message.

In step 460 of FIG. 4C, an operation is retrieved from the reply message. In embodiments of the present invention, voice control application 212 utilizes the commands from reply 225 to control application program 211. In one embodiment, voice control application 212 causes application program 211 to transition from a first execution state to a second execution state. In another embodiment, voice control application 212 causes a software operating system on electronic device 210 to initiate a first execution state of application program 211. Voice control application program 212 retrieves the first operation from reply 225 and executes it.

In step 465 of FIG. 4C, a logic operation is performed to determine which type of operation is to be performed. The first operation from reply message may be to play a first audio message to the user. Alternatively, the first operation may be to execute an operation from application command list 226. If the operation is an audio operation type, method 400 proceeds to step 470. If the operation is an application command, method 400 proceeds to step 475.

In step 470 of FIG. 4C, a voice prompt is played. If the operation being performed is to play an audio voice message, voice control application 212 causes electronic device 210 to play the voice prompt. Upon playing the audio voice message, method 400 proceeds to step 480 to determine whether another operation is to be performed.

In step 475 of FIG. 4C, an application command is executed. If the operation being performed is an application command, voice control application 212 executes the application command. In one embodiment, the application command can be a keypad controller command. Voice control application 212 executes the keypad controller command to simulate a keypad entry the user would perform in order to, for example, cause application program 211 to transition from a first execution state to a second execution state. Thus, in embodiments of the present invention, application command list 226 can comprise a sequence of keypad controller commands which simulate a series of keypad entries a user would perform in order to control application program 211. However, while the present embodiment recites keypad controller commands, embodiments of the present invention are well suited for sending other types of commands (e.g., touch screen controller commands) in application command list 226. In another embodiment, the application command may be an Application Programming Interface command for causing application program 211 to transition to a second execution state.

In step 480 of FIG. 4C, a logic operation is performed to determine whether another operation is to be performed from the operations list. If there are no other operations to be performed from application command list 226, method 400 ends. If there is another operation to be performed on application command list 226, method 400 returns to step 460 to get the next operation from application command list 226.

Thus, embodiments of the present invention provide a method for voice control of software applications resident on a portable device wherein the voice recognition is performed remotely. The method of the present invention allows a user to control software application using their voice without the necessity of installing speech recognition software upon their electronic devices. Furthermore, the user does not have to install dedicated speech recognition hardware upon their electronic devices. Because of the above reasons, the present invention is well suited for providing voice control of software applications upon small form factor handheld electronic devices such as cellular telephones and PDAs. Additionally, the present invention does not require altering or re-writing existing software applications in order to control them using spoken commands.

The preferred embodiment of the present invention, a method and system for voice control of software applications, is thus described. While the present invention has been described in particular embodiments, it should be appreciated that the present invention should not be construed as limited by such embodiments, but rather construed according to the following claims.

What is claimed is:

1. A system for voice control of software applications comprising:

an electronic device comprising:
- a processor coupled to a bus,
- a memory coupled to said bus,
- a plurality of application programs, and
- a voice control application resident in said memory and for causing said electronic device to transmit a message to a voice server,
  - wherein said message comprises a listing of said plurality of application programs and an audio waveform encoding of a voice command, and
  - wherein said voice command comprises a command to initiate an application program selected from said plurality of application programs; and said voice server for:

creating a textual equivalent of said audio waveform encoding, comparing said textual equivalent of said audio waveform encoding with a plurality of textual keywords in a command list associated with said plurality of application programs to determine said application program, generating a list of operations for initiating said application program, and transmitting a reply comprising said list of operations to said electronic device in response to said message.

2. The system as described in claim 1 wherein said electronic device is a portable electronic device.

3. The system as described in claim 1 wherein said voice control application is further for automatically creating said audio waveform encoding and automatically transmitting said data wirelessly to said voice server in response to said voice command.

4. The system as described in claim 1 wherein said list of operations comprises a series of user interface commands for initiating said application program.

5. The system as described in claim 1 wherein said list of operations comprises an application programming interface command for initiating said application program.

6. The system as described in claim 1 wherein said reply further comprises an annotated audio message associated with said list of operations.

7. The system as described in claim 6 wherein said annotated audio message comprises an audio waveform message.

8. A method for voice control of software applications on an electronic device comprising:

creating, by said electronic device, a first audio waveform encoding of a first voice command, wherein said first voice command comprises a command to initiate an application program selected from a plurality of application programs resident on said electronic device;

transmitting a first message to a voice server, wherein said first message comprises said first audio waveform encoding and a listing of said plurality of application programs resident on said electronic device;

performing, by said voice server, a speech recognition process upon said first audio waveform encoding, wherein said speech recognition process comprises:

creating a textual equivalent of said first audio waveform encoding, comparing said textual equivalent of said first audio waveform encoding with a plurality of textual keywords in a command list associated with said plurality of application programs resident on said electronic device, and determining said application program based upon said comparing;

sending, by said voice server, a first reply to said electronic device in response to said first message, wherein said first reply comprises a first list of operations for initiating said application program; and initiating, by said electronic device, a first execution state of said application program using said first list of operations.

9. The method as recited in claim 8, wherein said electronic device is a portable electronic device and wherein transmitting said first message to said voice server comprises automatically transmitting said listing to said voice server wirelessly in response to said first voice command.

10. The method as recited in claim 8, wherein said first list of operations comprises a list of user interface commands for initiating said application program.

11. The method as recited in claim 8, wherein said first list of operations comprises an application programming interface command for initiating said application program.

12. The method as recited in claim 8, wherein said first reply further comprises an annotated audio message associated with said first list of operations.

13. The method as recited in claim 12, wherein said annotated audio message is an audio waveform message.

14. The method as recited in claim 8 further comprising:

creating, by said electronic device, a second audio waveform encoding of a second voice command, wherein said second voice command comprises a command to transition said application program from said first execution state to a second execution state;

transmitting, by said electronic device, a second message to said voice server, wherein said second message comprises said second audio waveform encoding of said second voice command and data describing said first execution state of said application program;

performing, by said voice server, said speech recognition process upon said second audio waveform encoding to determine said second execution state of said application program;

sending, by said voice server, a second reply to said electronic device in response to said second message, wherein said second reply comprises a second list of operations for transitioning said application program from said first execution state to said second execution state; and transitioning, by said electronic device, said application program from said first execution state to said second execution state using said second list of operations.

* * * * *